United States Patent [19]

Chiou

[11] Patent Number: 4,993,065
[45] Date of Patent: Feb. 12, 1991

[54] ACCESSORY COMMUNICATION DEVICE FOR TELEPHONE SETS

[75] Inventor: Oliver C. Chiou, Taipei, Taiwan

[73] Assignee: Gamma Inc., Taipei, Taiwan

[21] Appl. No.: 334,152

[22] Filed: Apr. 4, 1989

[51] Int. Cl.⁵ .................... H04M 1/05; H04R 1/08
[52] U.S. Cl. .................................. 379/430; 381/183
[58] Field of Search ............... 379/447, 430; 381/183, 381/187, 67

[56] References Cited

U.S. PATENT DOCUMENTS

| | | | |
|---|---|---|---|
| 2,488,181 | 11/1949 | Fallek | 379/430 |
| 3,692,958 | 9/1972 | Dymoke | 379/430 |
| 4,491,699 | 1/1985 | Walker | 379/430 |
| 4,771,454 | 9/1988 | Wilcox, Jr. | 379/430 |
| 4,864,619 | 9/1989 | Spates | 381/183 |

FOREIGN PATENT DOCUMENTS

| | | | |
|---|---|---|---|
| 490362 | 1/1930 | Fed. Rep. of Germany | 379/430 |
| 2599922 | 12/1987 | France | 381/183 |
| 56-111396 | 3/1981 | Japan | 381/187 |
| 58-10994 | 1/1983 | Japan | 381/187 |
| 252032 | 9/1948 | Switzerland | 379/433 |

OTHER PUBLICATIONS 126,284 Pence's Specification, 5/2/1918.

Primary Examiner—Jin F. Ng
Assistant Examiner—M. Nelson McGeary, III
Attorney, Agent, or Firm—Ladas & Parry

[57] ABSTRACT

An accessory communication device for telephone sets includes: a wearer's harness member made of a flexible material for being manipulated to be worn around a user's neck; a pair of earphone arrangements each having a flexible cord and a connector provided thereto detachably held at the opposing sides of the wearer's harness member for being comfortably positioned in a user's ears; and a transmitting fixture having electric circuits and connecting members respectively disposed therein for making electrical connections with the earphone arrangements and a telephone set so as to effect communication transmitting and receiving operations therewith.

13 Claims, 5 Drawing Sheets

ACCESSORY COMMUNICATION DEVICE FOR TELEPHONE SETS

BACKGROUND OF THE INVENTION

This invention relates to an accessory communication device for telephone sets, and particularly to a necklace-type accessory communication device having a microphone unit and a pair of earphones detachably combined to make electrical connections with a telephone set for convenient communication operations.

Conventionally, accessory communication devices for telephone sets are usually grouped into two types—a handset type and a headset type The handset type is simple and can be arranged on a telephone set for easy pick-up and hang-on made by a user during communication. However, the problem suffered by this known handset-type communication device is that said handset does not allow a user the free use of both hands during communication operations. As a result of great effort, the telecommunication industry developed a hands-free telephone set in order to overcome the above-mentioned problem. However, said hands-free telephone set suffers two major drawbacks. The first of these drawbacks being that no privacy can be maintained by the user during his/her conversation due to the intercom-like nature of such a telephone set. The second drawback being that because of the afore-mentioned intercom-like nature of the hands-free telephone set, use thereof is not only disturbing to others but is also easily affected by background noise.

In order to overcome the above-mentioned problems, a headset accessory communication device, as shown in FIG. 1, was produced. However, the headband 1A cannot be suitably placed on the heads of various users and often causes some inconvenience, particularly to a lady's hairdo. In addition, no proper adjustment can be made on the receiver 1B and the microphone unit 1C, greatly affecting the quality of communication operations. (The German made BILSON VIKING 2318 and KHALDI 328 belong to this type of headset.)

In reaction to the problems which exist in the above-mentioned headset, a kind of a single ear-mask-type headset, entitled STARTSET II, as shown in FIG. 2, was developed by the U. S. Plantronics Company. Although this ear-mask-type of headset has no headband, the overall weight of the ear mask E, the earpiece F and the microphone boom G all placed on a single ear of the user, is uncomfortable to bear and presents a great inconvenience to the user. Moreover, if a user wears a pair of glasses, the burden which the ear of the user must bear is increased.

For making further improvement on the above-mentioned prior art, a stethoscope-type accessory communication device, as shown in FIG. 3, was developed to satisfy the demand for conducting a headband-free and quiet communication operation. However, owing to the hanging-down force of the binaural-band 3A, the earpieces 3B of this stethoscope-type communication device must be firmly placed in the user ears, otherwise the earpieces 3B can easily slip out of the user's ears, causing considerable discomfort. In addition, the microphone unit 3C cannot make a telescopic movement and frequently requires to be adjusted so as to align with the user's mouth. (The same drawback is true for the STETOMIKE headset produced by U. S. DANAVOX Co., and therefore the product was not widely accepted in the market.)

As can be seen in the drawings of FIGS. 1 through 3, a common drawback shared by the above-mentioned prior art is that the conspicuous exposure of the receiving and transmitting components of the prior art can hardly allow a user to enjoy certain secrecy during communication operations.

SUMMARY OF THE INVENTION

It is accordingly a primary object of the present invention to provide a necklace-type accessory communication device for telephone sets with a wearer's harness means which can be conveniently placed around the neck of a user.

It is another object of the present invention to provide a necklace-type accessory communication device for telephone sets with detachable receiving means which can be comfortably positioned in the user's ears without presenting any burden thereto and which can also be easily replaced with new receiving means if a malfunction occurs.

It is still another object of the present invention to provide a necklace-type accessory communication device for telephone sets with a unidirectional transmitting means for purposes of maintenance of privacy and directional sensitivity.

These and other objects of the present invention are achieved by providing a preferred embodiment of a necklace-type accessory communication device which comprises a combination of: a wearer's harness means made of a flexable metal material, having an opening at a rear portion thereof for being operated to movably place said accessory communication device around a user's neck; a receiving means composed of a pair of earpieces and detachably attached to said wearer's harness means for being comfortably positioned within a user's ears without posing any burden thereat and for being easily replaced if a malfunction occurs; and transmitting means with electric circuits and a unidirectional microphone unit disposed therein fixed at a front portion of said wearer's harness means for making electrical connections with said receiving means and a telephone set so as to effect transmitting and receiving functions therewith; whereby, said accessory communication device can be comfortably worn by a user for quiet communication operations without presenting a burden to the user's ears and conspicuously exposing the transmitting and receiving components thereof.

Other advantages and salient features of the present invention will become apparent from the following detailed description of a preferred embodiment when read in conjunction with the accompanying drawings.

DETAILED DESCRIPTION OF THE PREFERRED EMBODIMENT

Figure 1:
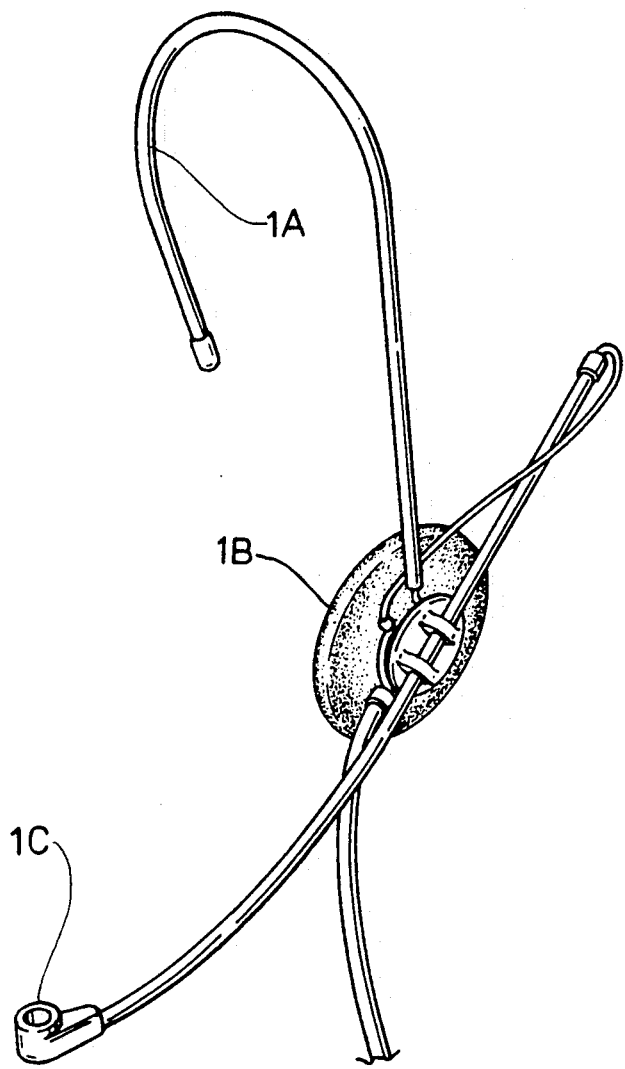
FIG. 1 is a schematic illustration of a known headset for communications.
Figure 2:
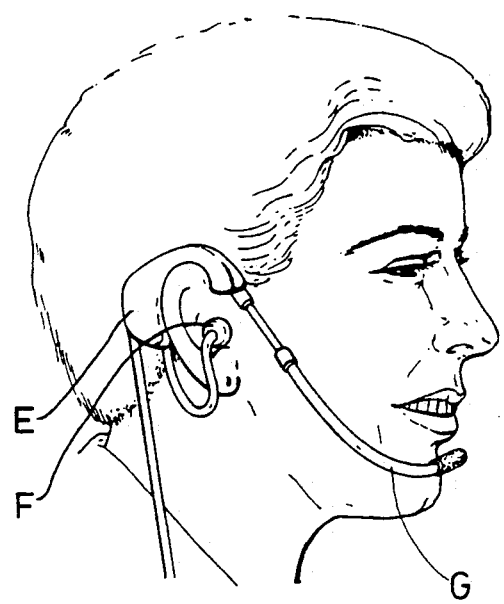
FIG. 2 is an illustration of a known ear-mask-type headset for communications.
Figure 3:
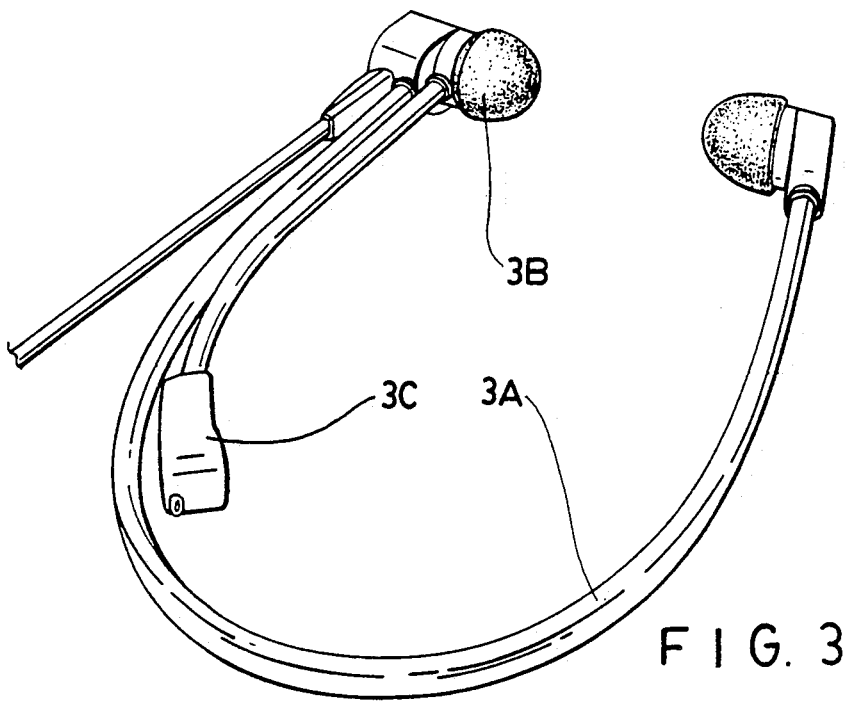
FIG. 3 is a perspective illustration of a known stethoscope-type headset for communications.
Figure 4:
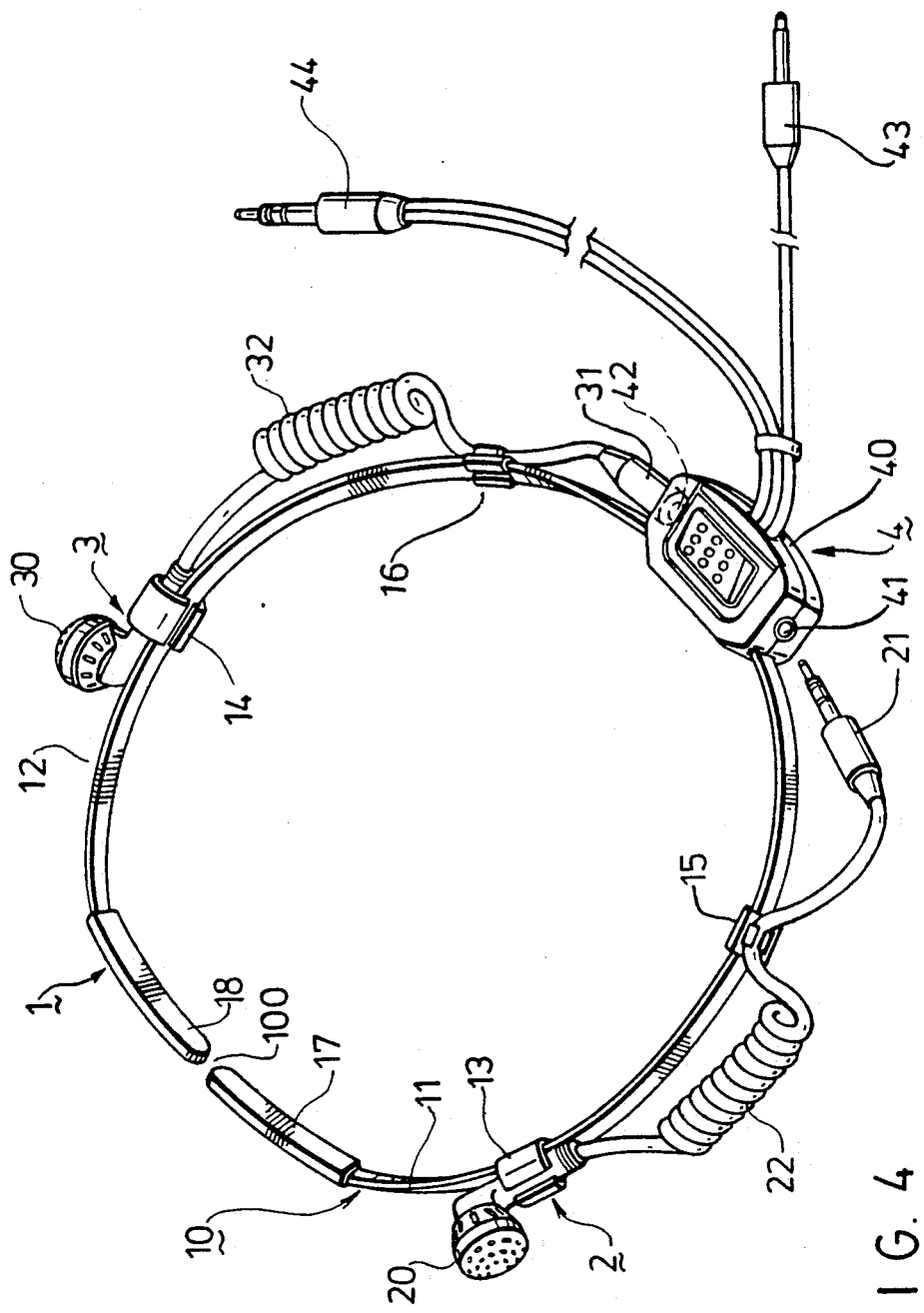
FIG. 4 is a perspective view of a preferred embodiment of a necklace-type accessory communication device according to the present invention.

Referring to FIG. 4, the preferred embodiment of a necklace-type accessory communication device according to the present invention comprises a combination of a wearer's harness means 1, receiving means 2, 3 and a transmitting means 4.

The wearer's harness means 1 includes; a collar member 10 made of a flexible metal tube with an open section 100 at a rear portion thereof for being operated to place said collar member 10 around a user's neck; a first earpiece retainer 13 and a second earpiece retainer 14 separately fixed at a proper place on the left portion 11 and the right portion 12 defined by the open section 100 of said collar member 10; a first cord clip 15 and a second cord clip 16 separately provided at a proper location of the collar member 10 below each earpiece retainer 13, 14; and a pair of sponge or rubber guards 17, 18 respectively provided around each end of the left and right portions 11, 12 of the collar member 10 at the open section 100.

The receiving means 2, 3 comprises a left earpiece 20 and a right earpiece 30 both of which are adapted to be detachably held by the first and second earpiece retainers 13, 14. Each one of the earpieces 20, 30 is electrically connected with a flexible cord 22, 32, and a plug 21, 31 wherein each flexible cord 22, 32 is detachably held by the respective first and second cord clips 15, 16, and each one of the earpieces 20, 30 is adapted for use within the ears of a user and furnished with a saramium-cobalt receiver for meeting Hi-Fi sound requirements. In addition, since said receiving means 2,3 are detachably arranged over the collar member 10, replacement can be easily made if a malfunction occurs.

The transmitting means 4 comprises: a housing body 40 with electric circuits (not shown) disposed therein fixed at a front portion of the collar member 10; a unidirectional microphone unit (not shown) installed in said housing body 40 and electrically coupled with said electric circuits thereof; a pair of jacks 41, 42 associated with said electric circuits provided in the opposing sides of said housing body 40 for making electrical connections with the plugs 21, 31 of the receiving means 2, 3 in effecting receiving operations therewith; and a pair of plugs 43, 44 respectively coupled with the electric circuits of the housing body 40 provided at a front side thereof wherein plug 43 is to be connected to an external power source or to an external microphone signal input jack (not shown) and plug 44 is to be connected to a telephone set or to an external receiving signal output jack (not shown). Since the electrical circuits disposed in the transmitting means 4 for effecting transmitting as well as receiving operations are well known to those skilled in the art and form no part of the present invention, description and illustration of the electric circuits are hereby omitted for simplicity.

Figure 5:
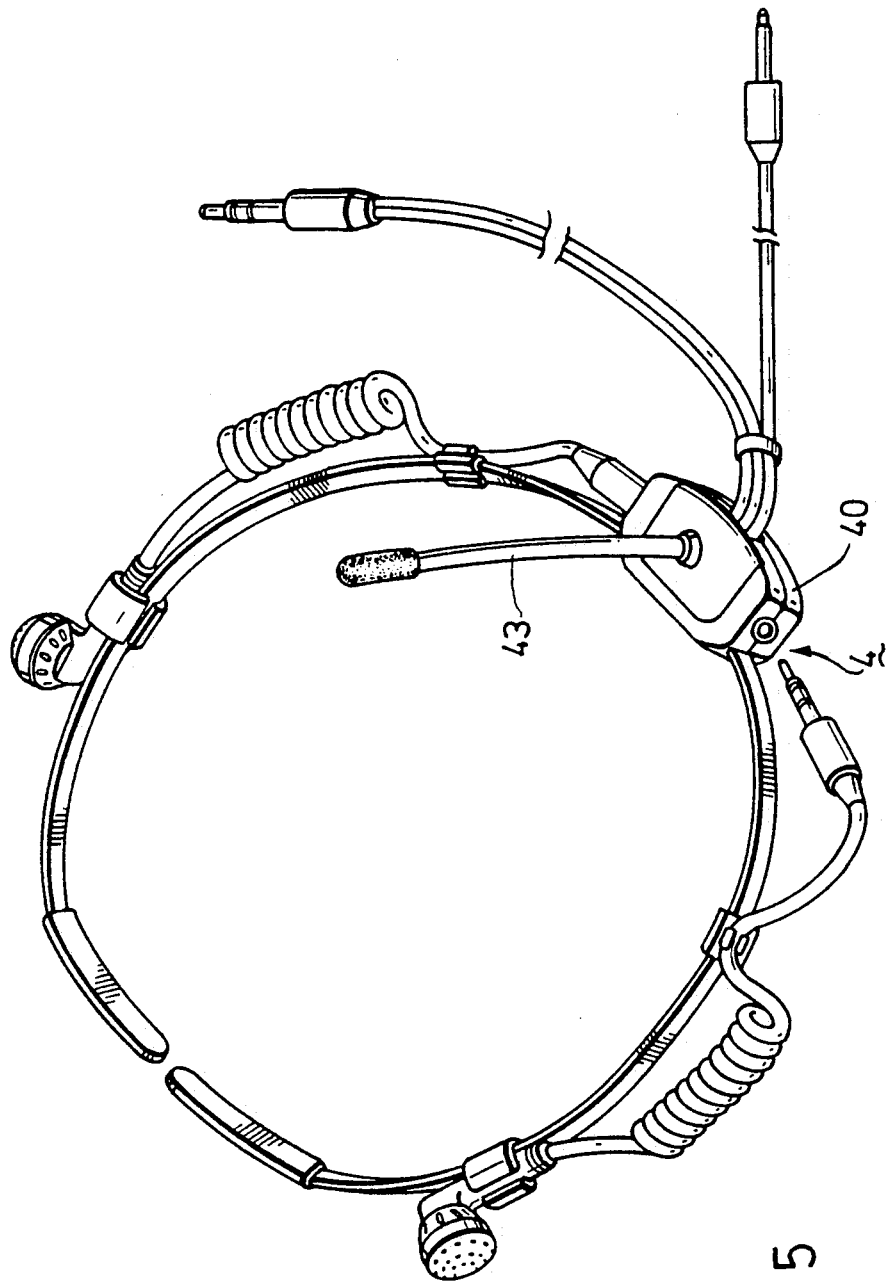
FIG. 5 is a perspective view of an alternative example of the preferred embodiment shown in FIG. 4.

Referring to FIG. 5, in order to avoid interference from the ambient noise around the transmitting means 4, a sound-guiding boom 43 is erectly installed on the housing body 40 and connected to the microphone unit of said transmitting means 4. With this sound-guiding boom arrangement, said microphone unit within the housing body 40 becomes a super-unidirectional microphone unit sensitive only to the user's sound. This sound-guiding boom is particularly suitable for those working in a noisy environment.

Figure 6:
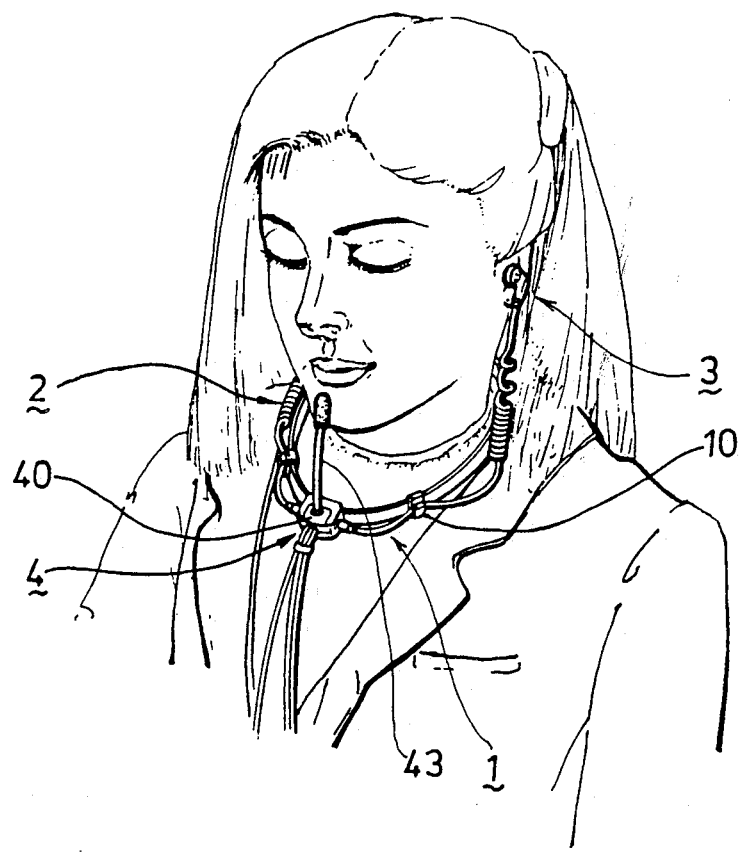
FIG. 6 is an illustrative view of the preferred embodiment placed around a user's neck.

Referring to FIG. 6 in connection with FIG. 4, before using the harness means 1, it is necessary to pull apart the open section 100 of said collar member 10 so as to widen the open section 100 and enable the collar member 10 to be placed around the user's neck with the housing body 40 of said transmitting means 4 situated at an upper portion of the user's chest and the sound-guiding boom 43 positioned in front of the user's mouth. The plugs 43, 44 may then be separately inserted into respective jacks of a specified telephone set or other communication equipment and the receiving means 2, 3 may be placed, one each, in both of the user's ears. In this way, communication operations can be conveniently performed therewith. In addition, the user has the option of either using both receiving means 2, 3 one in each ear, or just using one of said receiving means 2, 3 in either ear during communication operations, depending upon what the situation dictates.

Having thus described the invention, it is apparent that many embodiments thereof can be made without departing from the spirit and scope of the invention. Therefore, it is intended that the specification and drawings be interpreted as illustrative rather than in a limiting sense except as defined in the appended claims.

What is claimed is:

1. An accessory communication device comprising:
   a user's harness means;
   a receiving means detachably disposed on said user's harness means, said receiving means comprises a left and a right earpiece and a left and a right retainer to which said earpieces are respectively and detachable disposed, so as to permit a user to conveniently utilize the right earpiece or the left earpiece only, or both earpieces at the same time; and
   a transmitting means having circuit means and a microphone unit disposed therein for making electrical connections with said receiving means and a telephone set in effecting communication transmitting and receiving operations therewith.

2. An accessory communication device comprising:
   a collar member made of flexible material with an open section located at a rear portion thereof for being manipulated to place said collar around a user's neck;
   a first retainer and a second retainer separately fixed at opposing sides of said collar member;
   a first clip and a second clip respectively provided at opposing sides of said collar member and located below said first and second retainers;
   a pair of pliable guard members separately provided around each end portion of said collar member at said open section for purposes of providing comfort to the user of said collar member;
   receiving means detachably disposed on said collar member by said retainers; and
   transmitting means having circuit means and a microphone unit disposed therein for making electrical connections with said receiving means and a telephone set in effecting communication transmitting and receiving operations therewith.

3. An accessory communication device according to claim 2 wherein said receiving means comprises:
   a left earpiece and a right earpiece both of which are adapted to be positioned in a user's ears and both of which are formed to be detachably kept in said first and second retainers for convenient use, each of said left and right earpiece having a flexible cord detachably held in said first and second clips on said user's harness means and a connecting means electrically attached thereto for detachably making electrical connection with said transmitting means on a selective basis.

4. An accessory communication device according to claim 3 wherein each of said left and right earpieces comprises a saramium-cobalt receiver installed therein for meeting high-quality sound requirement.

5. An accessory communication device according to claim 4 wherein said transmitting means comprises:
a housing body fixed on a front portion of said collar member for receiving said circuit means and microphone unit therein;
a pair of jacks separately provided at opposing sides of said housing body and electrically associated with said ciruit means for being detachably connected with said connecting means of said left and right earpieces on a selective basis; and
a pair of connecting plugs attached to said housing body and electrically associated with said circuit means thereof for respectively making electrical connections with external communication equipment in effecting communication transmitting and receiving operations therewith.

6. An accessory communication device according to claim 5 wherein said microphone unit is a unidirectional microphone.

7. An accessory communication device according to claim 6 wherein said microphone unit further comprises a sound-guiding member erectly installed on top of said housing body and functionally connected with said microphone unit for achieving super-unidirectional sensibility therewith during communication transmitting operation.

8. An accessory communication device comprising:
a collar member to be worn around a user's neck, said collar member having an open section to permit a user to place said collar around the user's neck;
a first retaining means and a second retaining means located at opposite sides of said collar member;
receiving means detachably disposed on said collar member by said retaining means, so that a user can detach said receiving means from said collar for placement in the user's ear; and
transmitting means for effecting transmitting and receiving operations.

9. An accessory communication device as claimed in claim 8 wherein said receiving means comprises:
a left earpiece and a right earpiece both of which are adapted to be positioned in a user's ears and both of which are formed to be detachably kept in said first and second retainers for convenient use, each of said left and right earpiece having a flexible cord detachably held in said first and second clips on said user's harness means and a connecting means electrically attached thereto for detachably making electrical connection with said transmitting means on a selective basis.

10. An accessory communication device as claimed in claim 9 wherein each of said left and right earpieces comprise a saramium-cobalt receiver installed therein for meeting high-quality sound requirement.

11. An accessory communication device as claimed in claim 10 wherein said transmitting means comprises:
a housing body fixed on a front portion of said collar member for receiving said circuit means and microphone unit therein;
a pair of jacks separately provided at opposing sides of said housing body and electrically associated with said circuit means for being detachably connected with said connecting means of said left and right earpiece on a selective basis; and
a pair of connecting plugs attached to said housing body and electrically associated with said circuit means thereof for respectively making electrical connections with external communication equipment in effecting communication transmitting and receiving operation therewith.

12. An accessory communication device as claimed in claim 11 wherein said microphone unit is a unidirectional microphone.

13. An accessory communication device as claimed in claim 12 wherein said microphone unit further comprises a sound-guiding member erectly installed on top of said housing body and functionally connected with said microphone unit for achieving super-unidirectional sensibility therewith during communication transmitting operation.

* * * * *